Oct. 14, 1930.  H. HUEBER  1,778,256
WINDSHIELD CLEANER
Filed July 29, 1927
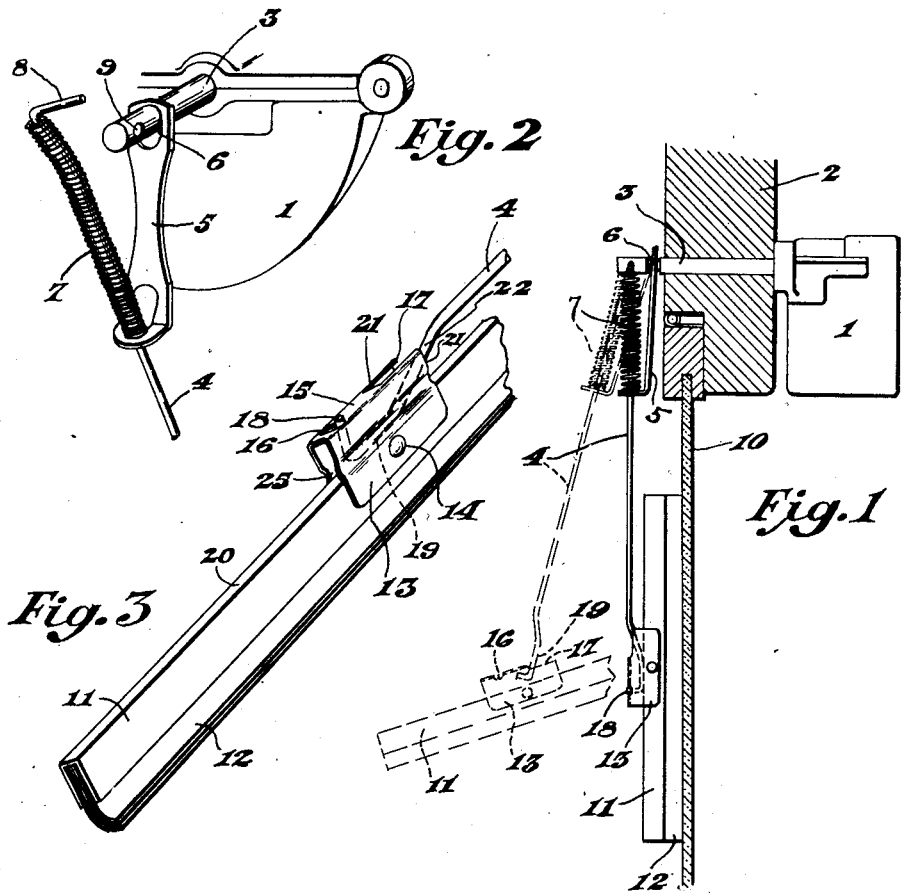
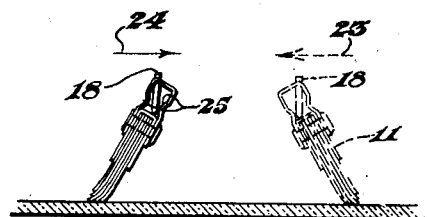

Patented Oct. 14, 1930

1,778,256

UNITED STATES PATENT OFFICE

HENRY HUEBER, OF BUFFALO, NEW YORK, ASSIGNOR TO TRICO PRODUCTS CORPORATION, OF BUFFALO, NEW YORK

WINDSHIELD CLEANER

Application filed July 29, 1927. Serial No. 209,262.

This invention relates to a windshield cleaner and more particularly to a wiper and the manner of mounting the same. The ordinary cleaner now in use embodies a wiper carrying arm having on its free end a clip in which the wiper bar or element is secured in some mechanical way, as by means of a screw or bolt. In the more efficient and practical windshield cleaner of today this clip is so designed as to provide for a limited amount of lateral wobble or play of the wiper element independently of the clip which supports it. This play is frequently referred to as the flop of the wiper and is provided primarily to gain the most efficient wiping action from the wiper. Thus, at the beginning of each stroke of the wiper it will flop so as to trail and drag along behind the wiper arm at an acute angle to the glass surface. Such a flop in the mounting of the wiper is especially desirable for automatic windshield cleaners in which the operation is continuous and uniform as distinguished from a manually operated cleaner wherein the wiping pressure or contact may be varied more or less by the individual as he strokes the wiper back and forth across the windshield. It sometimes occurs that the clip which is attached to the wiper arm becomes bent or twisted from a true position so that the wiper will flop to one side only and remain substantially perpendicular to the windshield glass on the return stroke in which position the wiper will "chatter" across the glass and thereby obscure the vision therethrough to the confusion of the operator of the vehicle.

The present invention has for its primary object to provide a simplified and improved mounting for the wiper which may be economically and expeditiously manufactured and which will possess the desired flop of the wiper; as well as a toolless mounting in which the wiper may be attached and detached without tools or other special equipment.

A further object is to provide an improved windshield cleaner construction embodying a spring arm arrangement with a readily detachable connection to the wiper bar which connection is maintained operative throughout the operation of the wiper by means of the spring pressure exerted by the spring arm.

Still further objects of the invention are to provide a stronger construction of the wiper member per se; to provide an improved form of spring arm which may be readily attached and detached from the improved wiper when either is moved from their normal operative relation or to an abnormal position; to provide an improved wiper and arm assembly in which the pressure exerted by the arm is transmitted directly to the wiper and not through the intermediary of an interposed part or parts; and to provide an improved wiper and arm assembly with a novel means for limiting the flop or throw of the wiper during its operation.

In the drawings,

Fig. 1 is a fragmentary vertical section through a windshield equipped with the improved cleaner;

Fig. 2 is a detailed perspective view illustrating the detachable manner of connecting the wiper carrying arm to the operating shaft of the windshield cleaner motor;

Fig. 3 is an enlarged detailed perspective view more clearly depicting the mounting of the wiper on the wiper arm; and Fig. 4 is a more or less diagrammatic showing exemplifying the flopping action of the wiper.

In proceeding in accordance with the present invention there is depicted a windshield cleaner motor 1 mounted to the rear of the header bar 2 of a windshield frame construction with the shaft 3 of the motor extending through the header bar to the front side thereof for having the wiper arm 4 attached thereto. The wiper arm is preferably detachably secured to the motor shaft 3 by means of a resilient device so that the arm may possess inherent resiliency or not. This particular spring arm construction constitutes the subject matter of my copending application filed January 18, 1926, Serial No. 81,895, and in its preferred embodiment comprises a stirrup 5 which is hung over the shaft 3, in a groove 6 therein, and engaged beneath a spring 7 coiled about the arm 4 to support the same. In mounting the arm on the shaft, said arm is pulled downwardly against the spring pressure to engage its pivot 8 in an opening 9 of the shaft. Thus, the spring is normally under compression and such compression will provide sufficient spring potential energy to maintain the detachable connection 8, 9 operative as well as exert a pull on the free end of the arm 4 toward the windshield glass 10. This obviously provides a connection between the upper part of the arm and the shaft which is itself readily detachable without the use of any tools whatever, as distinguished from the former practise of requiring a screw driver, pliers or the like to manipulate a set screw or some other special clamping means.

The wiper is of bar shape and comprises a metal backing strip or holder 11 substantially of U-form and a flexible blade 12 which is interposed between the side walls of the holder 11 and securely clamped in position as by compressing said walls in an obvious manner. Formerly, this holder was pierced through its side walls and intermediate its ends to provide a hole through which a screw was inserted for connecting the wiper to the clip which was permanently fixed to the lower or free end of the wiper carrying arm. Because of the fraility and lightness of the metal from which this holder was formed, this hole would naturally tend to weaken the same and provide a definite line of break centrally thereof along which the wiper would bend or break under certain conditions. In carrying out the spirit of the present invention, a reinforcing clip 13 is permanently fixed to the wiper as by means of a rivet or similar fastener 14 which is passed through transversely alined apertures in the opposite walls of the substantially U-shaped clip 13 and through a registering aperture in the interposed holder 11, the walls of the clip being brought firmly against the opposite sides of said holder to a considerable distance on both sides of the aperture. Therefore, while the holder is still provided with an aperture, any weakening tendency resulting from such provision is more than offset by the reinforcement provided by the comparatively broad engagement of the walls of the clip 13 with the opposite sides of the holder 11 on both sides of the aperture.

The back 15 of the clip is spaced off the holder and is provided with an opening 16 and a slot 17, the latter opening through the upper edge of the back of the clip, with reference to Figs. 1 and 3, and the opening 16 being disposed in a lower plane. The lower or free extremity of the arm 4 is deflected outwardly at a substantially right angle to provide a lug or stop part 18, more in the nature of a right angular hook. This lug or stop part is designed to be hooked into opening 16 in the back of the clip to define the limit of flop of the wiper relative to the arm, and to facilitate this hooking operation the shank portion 22 of the wiper arm 4 adjacent the stop part is deflected rearwardly, with respect to the windshield, to produce a comparatively short bearing edge 19 for engaging the exposed back 20 of the holder 11. The arm being normally urged inwardly it will be obvious that the bearing edge 19 normally rests on the back 20. In this connection it will be noted that the lug or stop part 18 is of sufficient length so as not to be displaced from the opening 16. The wall portions 21 of the clip 13 constitute guiding flanges for extending alongside of the deflected shank portion 22 so as to substantially prevent any relative movement of the wiper with respect to the arm 4 in a plane parallel to the windshield glass.

During operation, the stop part 18 is always in contact with one or the other of the opposite sides or ends of the opening 16, which opposite sides or ends constitute spaced shoulders to limit the extent of flop. With reference to Fig. 4, if the wiper is moving in the direction of arrow 23, the stop part 18 will be engaged with the side of the opening 16 with which it is shown in engagement in Fig. 3. Now at the end of this stroke and as soon as the wiper arm starts its return movement in the direction indicated by arrow 24 the wiper will be tilted over in the opposite direction until limited by said stop part 18 which now will engage the opposite side or shoulder of the opening 16, the bearing edge 19 still maintaining pressure on the back 20. Thus, the right degree of flop, which is very desirable in the automatic cleaner, is determined by the stop part alternately engaging with the spaced shoulders provided by the recess or opening 16. By reason of the slot 17 the guiding flanges 21 of the clip 13 will have more effective engagement and contact with the wiper arm to prevent any substantial amount of play of the wiper laterally of the arm.

The opposite walls of the clip immediately above the holder 11 are formed or bowed inwardly thereby producing inwardly extending beads 25 which control or limit the lateral play movement of the bearing edge 19 on the back 20. This provision assists in defining the movement of the wiper in its relation to the rod to a fixed degree, and also obstructs any pivotal movement of the clip about the single rivet 14 by reason of the fact that the beads closely overhang the back of the holder.

By the foregoing construction the wiper arm is reduced to an exceedingly simple construction, the spring-encircled rod per se having its upper part, which is attached to the wiper operating shaft, bent at an angle to lie in a plane substantially at right angles to the plane of the stop part 18. The arm 4 is normally urged by its spring device about the pivot 8 so that the bearing edge 19 will always rest under pressure upon the back 20 of the wiper. Therefore the inward thrust is directly received on the wiper and not through an intermediary, such as the clip, the latter functioning solely to retain the wiper operatively related to the wiper arm and to provide for the necessary and desirable flop. Either end of the wiper-carrying arm may be readily disconnected without tools, the arm being swung outwardly as indicated in the dotted showing in Fig. 1 to permit mounting and replacement of the wiper on the lower end, while the upper end may readily be disconnected in a manner indicated in Fig. 2. The clip is thus designed to receive the angular lower end of the rod-like arm in such a manner that the pressure of the arm is exerted directly on the wiper dependently of the clip. Furthermore, by having the stop part 18 engaged in the opening 16 the wiper is restrained from longitudinal movement relative to the arm 4 so that the wiper is positively maintained in its operative position under the spring pressure. The clip being fixedly secured to the wiper it will be obvious that the holder is considerably reinforced and strengthened, adding to the life thereof. Furthermore, the hole which is formed in the holder is comparatively small relative to the hole which has heretofore been formed in the wiper since in the previous constructions the hole would have to be considerably larger than the bolt or screw passing therethrough in order that the wiper might have the desired flop in operation.

In engaging the stop part 18 in the opening 16, the wiper and arm are caused to assume the relation substantially shown in dotted lines in Fig. 1. With the arm and wiper so disposed, the stop part is passed through the slot 17, under the back of the clip and up through the opening 16. For demounting the wiper a reversal of these steps is followed after first swinging the wiper out to the dotted line position. By reason of the deflected portion 22 of the arm 4 the guiding flanges 21 are effectively engaged therewith to prevent lateral swinging of the wiper in a plane parallel to the glass. This deflection in the arm also limits the length of the bearing edge 19 so that the effective bearing contact between the arm and the wiper is comparatively short and over a length of the wiper which is protected by the enclosing clip. This construction provides a connection which may readily be made in a facile manner and without the use of any tools whatsoever. This is a material advantage over the former style of mounting and will be just as effective when replacing a wiper as when during the initial installation. In the former style of mounting, and after some months of service, the screws or other fastening devices frequently became rusted to such an extent as to be no longer serviceable and requiring the replacement of another arm as well as the wiper. With the improved mounting it will be observed that the motorist can not only replace the arm without the use of tools but may also replace the wiper in a like manner and by a very simple manipulation.

I claim as my invention:

1. In a windshield cleaner, a wiper, a U-shaped clip secured in inverted relation over the back thereof, and a wiper arm extending into the clip and bearing directly on the wiper, said arm having a stop part extending outwardly away from the wiper and between the walls of the clip for alternate engagement therewith in limiting the flop of the wiper relative to the arm.

2. In a windshield cleaner, a wiper, a clip rigidly secured over the back of the wiper with the back of the clip spaced from the back of the wiper, said clip having an opening in its back and also a slot in its back opening through one end thereof, and a wiper arm having an angular portion extending between the walls of the clip and bearing directly on the wiper, and a stop part carried by the arm and extending into the opening of the clip for limiting the degree of flop of the wiper relative to the arm, said arm being movable into the clip slot to effect engagement of said stop part in the opening.

3. A windshield cleaner comprising a wiper blade, a U-clip secured thereto over the back thereof, and a wiper arm disposed in the clip and having an angular part extending away from the back of the wiper and between the walls of the clip, said clip being provided with an aperture receiving the angular part and being larger than said angular part to permit of said blade flopping back and forth during movement of the arm and also securing the wiper from displacement on the arm, said clip also having a slot adjacent the aperture for enabling the insertion of said angular part into the clip and the engagement of said angular part in the clip aperture.

4. A windshield wiper blade having a U-shaped holder, a wiping element held in the channel thereof, a U-shaped clip inverted over the back of the holder in straddled relation with the back of the clip spaced from the back of the holder in opposition thereto, and an attaching element securing the sides of the clip to the sides of the holder the sides of the clip being offset inwardly toward each other and over the back of the holder to form shoulders for cooperating with the holder in holding the clip against any pivotal movement about said means in the longitudinal plane of the holder, the back of said clip having a hole therein and an adjacent slot, the slot permitting the hooked end of a wiper arm being engaged in the opening for the attachment of the blade to the wiper arm.

5. A wiper arm, and a wiper blade having an attached clip for attachment to said arm, said clip receiving an end portion of the arm and being formed with spaced sides, said arm having an angular extremity extending outwardly between said sides, the space between said spaced sides being larger than said extremity of the arm to permit of the blade flopping about said end portion.

6. A windshield cleaner comprising a wiper blade, a U-clip secured thereto over the back thereof, and a wiper arm disposed in the clip and having an angular part extending away from the back of the wiper and between the walls of the clip, said clip being provided with an aperture receiving the angular part and being larger than said angular part to permit of said blade flopping back and forth during movement of the arm and also securing the wiper from displacement on the arm.

7. A windshield wiper blade having a U-shaped holder, a wiping element held in the channel thereof, a clip having a back wall and sides arranged over the back of the holder in straddled relation therewith, and an attaching element securing the sides of the clip to the sides of the holder, the sides of the clip being offset inwardly toward each other and over the back of the holder to form shoulders, said clip having its back wall formed with an opening in which the hooked end of a wiper arm may engage, said clip having its sides between the shoulders and the back wall spaced apart to receive the hooked end of the wiper arm.

8. In combination, a windshield wiper blade including a wiping element, a holder therefor, an attaching clip having spaced sides straddling and connected to the holder and a back wall between the sides formed with an opening, and a blade carrying arm received between the sides and having an angular extremity upturned into the back wall opening, the walls of the opening entirely surrounding the upturned extremity, said upturned extremity holding the blade with its clip against displacement lengthwise of and from the arm.

HENRY HUEBER.